UNITED STATES PATENT OFFICE.

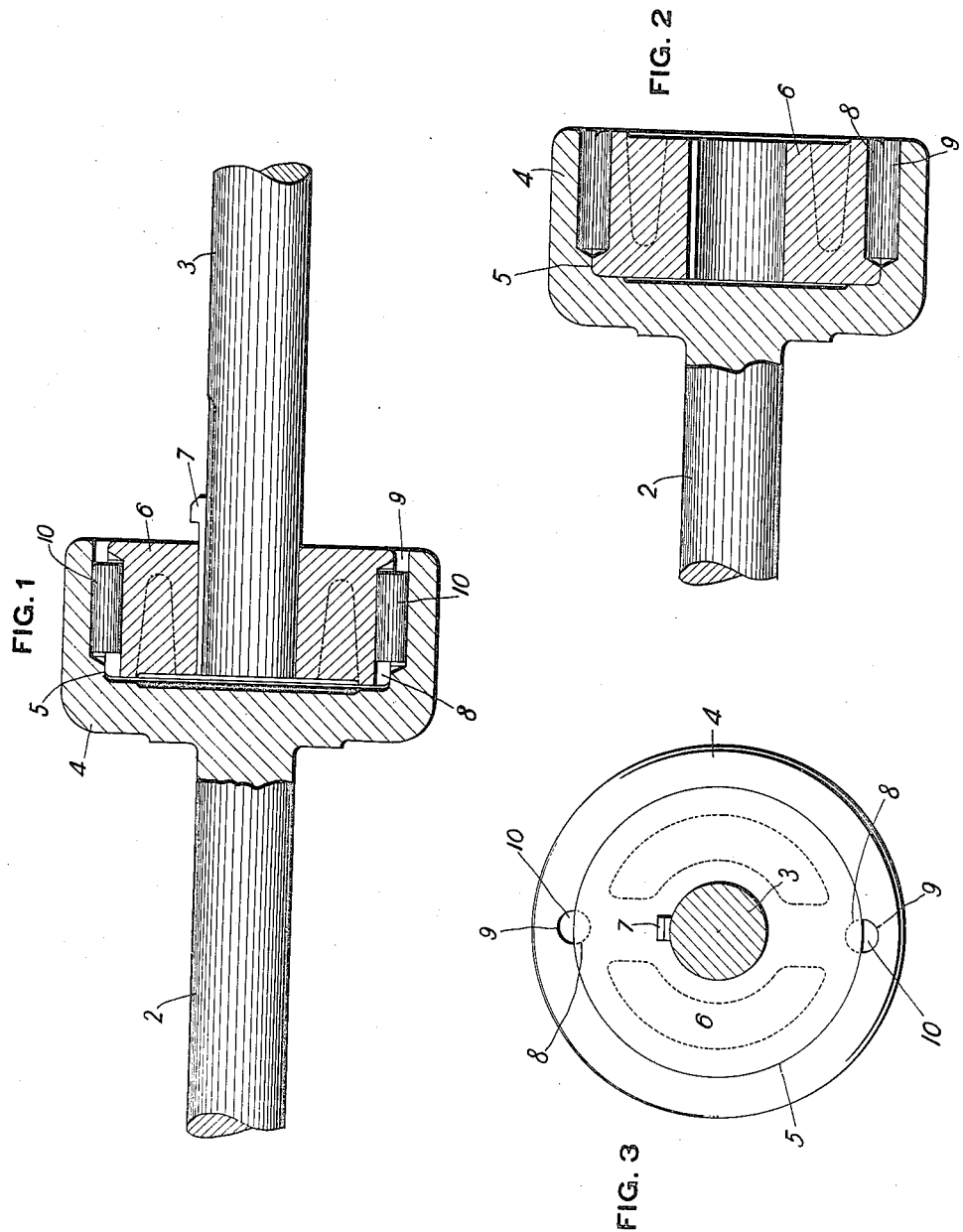

HOMER D. WILLIAMS AND WILLIAM AHLEN, OF DUQUESNE, PENNSYLVANIA.

EXPANSION-COUPLING.

1,220,483.　　　　　Specification of Letters Patent.　　Patented Mar. 27, 1917.

Application filed November 22, 1913. Serial No. 802,464.

*To all whom it may concern:*

Be it known that we, HOMER D. WILLIAMS, a citizen of the United States, and WILLIAM AHLEN, a subject of the King of Sweden, both residing at Duquesne, in the county of Allegheny and State of Pennsylvania, have invented a new and useful Expansion-Coupling, of which the following is a specification.

Our invention relates to the class of appliances known as shaft couplings, and employed in securing the adjoining ends of two power shafts together in such manner that rotary motion imparted to one shaft is transmitted by the coupling to the other shaft, and the invention more particularly relates to expansion couplings in which provision is made for relative lengthwise movement of the connected shafts due to lineal expansion and contraction of the shafts.

The coupling forming our invention is particularly adapted for use with shafts extending lengthwise beneath and forming part of the driving mechanism of cooling beds and similar apparatus by which a large number of highly heated bars are transferred transversely of their length, while being cooled, from one side to the other of the cooling bed, and in which location the shafts and couplings are subjected to an intense heat radiated by the heated materials being handled and cooled upon the hot beds.

Referring to the drawings forming part of this specification, Figure 1 is a plan partly in section showing an expansion coupling as constructed and arranged and applied for use to connect the adjoining ends of two shafts, in accordance with this invention. Fig. 3 is an end elevation of the apparatus shown in Fig. 1. Fig. 2 is a sectional plan showing the manner in which the parts forming the coupling are assembled in one stage of the manufacture of the couplings.

In the accompanying drawings, the numerals 2 and 3 designate two shafts, the ends of which are connected together by means of our improved coupling. The shaft 2 has an enlarged end forming a flange 4, which as shown, is formed integral therewith and this flange 4 is provided in one end with a recess 5.

The shaft 3 has a disk rigidly secured thereon to form a flange 6, as shown, a key 7 being employed to secure the flange on the shaft.

The flange 6 is arranged to be positioned within the recess 5 in the flange 4 and the periphery of the flange 6 is provided with a plurality of semi-cylindrical transversely extending grooves 8 which register with similar semi-cylindrical grooves 9 in the side surface of the recess 5 in the flange 4. The flange 6 is turned or machined to a size which will permit it to enter the recess 5 which also is bored or machined, these parts being made to form a neat sliding fit so that there will be little or no angular movement therebetween, while relative lengthwise movement in a direction parallel to the length of the shafts is permitted to care for expansion and contraction of the coupled shafts.

Positioned within the registering pairs of recesses 8 and 9, which together form cylindrical openings, are cylindrical pins 10, which are employed to prevent relative angular movement of one shaft relative to the other when the parts are assembled to connect the ends of two shafts together, and through which rotary motion is transmitted by the flange 6 on one to the flange 4 on the other shaft.

In constructing the couplings the flange 6 is machined to the desired diameter and the flange 4 on the shaft 2 is bored or machined to form the recess 5 therein to the required diameter to form a neat sliding fit with the flange 6. The flange 6 is then placed within the recess 5 with what is the outer end of the disk when in use in engagement with the bottom of the recess 5. Holes are then drilled lengthwise parallel to and coincident with the joint formed between the periphery of the flange 6 and engaging face of the enlarged end 4, care being taken to drill these holes exactly parallel and in alinement with the longitudinal center of the central openings in the disks 6 or, what is the same thing, the axial center of the shafts to which the parts are fastened later.

It will be noted that the bottoms of the so-formed holes do not extend to what is then the inner end of the flange 6 so that when the parts are assembled as shown in Figs. 1 and 3, the pins 10 are held within the recesses in which they are placed and cannot be removed so long as the flange 6 extends within the recess 5 in the flange 4 of the shaft 2.

In the use of our improved coupling the parts are constructed as has been described and are then assembled as shown in Figs. 1 and 3. Preferably, the key-way in the shaft 3 for the key 7 is made of such length as will permit of the flange 6 being positioned within the recess of the flange 4 on the shaft 2 by sliding this flange on the shaft 3 after the shafts are placed in the bearings in which they are rotatably mounted in the relative position shown. When inserting the flange 6 within the recess 5 the pins 10 are placed within the grooves 8 in this flange and the flange is then moved forwardly until its inner face is flush with the end of the shaft 3, the key 7 then being driven into place.

It will be readily seen that whenever relative lengthwise movement of the shafts occurs, at least one of which is usually of considerable length, the flange 6 will move freely axially within the recess 5 in the flange 4 due to the expansion and contraction of the shafts, while the pins 10 in the holes formed by the grooves or recesses 8 and 9 will positively prevent relative angular movement of the shafts and cause these shafts to rotate in unison when power is applied to either.

The advantages of our invention arise from the simplicity of the coupling, the small cost thereof, and ease with which the parts can be constructed and assembled.

By reason of the fact that the head 6 on the shaft 3 fills radially the socket 4 on the shaft 2, the two shafts are maintained in longitudinal alinement in a very simple and efficient manner, while the keys 10 radially filling the grooves 8 and 9, interlock the head and the socket against independent rotation, and thereby compel the two shafts to rotate simultaneously.

By having an enlarged head 6 and an enlarged socket 4, the keys 10 are located at a considerable distance from the peripheries of the shafts, whereby power is transferred from one shaft to the other shaft in the most effective manner. The keys 10 are substantially non-flexible or non-elastic so as to positively interlock the shafts against independent rotation. While these keys fill the combined grooves radially, each key is somewhat shorter than each groove, whereby endwise play of the head 6 within the socket 4 is permitted for the purpose of compensating for expansion and contraction.

Modifications in the construction and arrangement of the parts may be made without departing from our invention. The flange on the shaft 2 may be formed separate therefrom and keyed to this shaft in the same manner as shown for fastening the flange 6 on the shaft 3, instead of, as shown, forming the flange 4 integral with the shaft 2, and other changes may be made within the scope of the appended claim.

We claim:—

The combination of a pair of alined shafts, one shaft having a terminal enlarged socket fixed thereon, the other shaft having a terminal enlarged head fixed thereon and radially filling the socket, whereby alinement of the shafts is preserved, the inner periphery of the socket and the outer periphery of the head having registered grooves extending in substantial parallelism with the shafts, the outer end of the groove in the socket being open and the inner end being closed, the inner end of the groove in the head being open and the outer end being closed, and a substantially non-flexible key radially filling the registered grooves and of a length less than that of each groove, whereby the shafts are locked against independent rotation and are capable of independent endwise movement to compensate for expansion and contraction.

In testimony whereof, we have hereunto set our hands.

HOMER D. WILLIAMS.
WILLIAM AHLEN.

Witnesses:
CHARLES McK. MOORE,
GEORGE L. NEFF.